(12) United States Patent
Yamamiya (10) Patent No.: US 8,243,250 B2
(45) Date of Patent: Aug. 14, 2012

(54) PHOTOGRAPHIC LENS UNIT AND ELECTRONIC APPARATUS USING THE SAME

(75) Inventor: Kunio Yamamiya, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 625 days.

(21) Appl. No.: 12/397,795

(22) Filed: Mar. 4, 2009

(65) Prior Publication Data
US 2009/0231537 A1  Sep. 17, 2009

(30) Foreign Application Priority Data

Mar. 13, 2008  (JP) .................................. 2008-064404
Jul. 18, 2008  (JP) .................................. 2008-187352

(51) Int. Cl.
*G02F 1/13* (2006.01)
*G02F 1/1335* (2006.01)
*G03B 17/00* (2006.01)

(52) U.S. Cl. ............................. 349/200; 349/57; 396/55

(58) Field of Classification Search .................. 349/200, 349/57; 396/55
See application file for complete search history.

(56) References Cited

U.S. PATENT DOCUMENTS

| | | | |
|---|---|---|---|
| 4,919,520 A * | 4/1990 | Okada et al. | 349/13 |
| 7,522,256 B2 * | 4/2009 | Horiuchi et al. | 349/200 |
| 2005/0134776 A1 * | 6/2005 | Imai et al. | 349/123 |
| 2006/0018643 A1 | 1/2006 | Stavely et al. | |
| 2006/0164540 A1 | 7/2006 | Kayanuma | |

FOREIGN PATENT DOCUMENTS

| | | |
|---|---|---|
| CN | 1818737 | 8/2006 |
| JP | 2004-170852 A * | 6/2004 |
| JP | 2006031027 | 2/2006 |
| JP | 2007058089 | 3/2007 |

OTHER PUBLICATIONS

Office Action dated Mar. 23, 2010 from corresponding Chinese Patent Application No. 200910126631.7.

\* cited by examiner

*Primary Examiner* — Mark Robinson
*Assistant Examiner* — Robert Tavlykaev
(74) *Attorney, Agent, or Firm* — Volpe and Koenig, P.C.

(57) ABSTRACT

A unit including lenses and a liquid crystal optical element located inside a lens barrel frame, an optical image-electric signal converting element located on a converting element holder, a driving mechanism relatively driving the holder to a board on a base of the barrel frame in directions perpendicular to an optical axis of the lenses, and a holder fixed to the barrel frame and holding the optical element by first and second facing portions of two retention members. The first facing portion includes a first surface and a second surface crossing the first surface, these surfaces contact with a first side and a second side crossing the first side of at least one transparent electrode plate of the optical element to position the optical element perpendicular to the optical axis. The second facing portion presses and positions the optical element on the first facing portion in an optical axis direction.

8 Claims, 7 Drawing Sheets

PHOTOGRAPHIC LENS UNIT AND ELECTRONIC APPARATUS USING THE SAME

CROSS-REFERENCE TO RELATED APPLICATIONS

This application is based upon and claims the benefit of priority from prior Japanese Patent Applications No. 2008-064404, filed Mar. 13, 2008; and No. 2008-187352, filed Jul. 18, 2008, the entire contents of both of which are incorporated herein by reference.

BACKGROUND OF THE INVENTION

1. Field of the Invention

The present invention relates to a photographic lens unit including a liquid crystal optical element, and an electronic apparatus using the same.

2. Description of the Related Art

An image blur resulting from camera shake is a general problem in photography. When a lens having a relatively large focal length is used, the influence of the movement (sway) of a camera becomes large in proportion to the focal length of the lens, and hence the above problem becomes particularly serious. Particularly, in the setting in the photography of the case where the focal length is large, there is the possibility of the camera shake becoming a factor limiting the capability of the photographer to take a photograph without a blur unless corrective measures are taken.

In the conventional blur correction device, the actuator for driving the imaging element requires large power. Accordingly, the whole apparatus is made large in size, and the angle of twist of the flexible circuit board changes when the image element moves in the second direction, and hence the magnitude of the deformation resistance varies in accordance with the angle of twist, thereby changing the controlled variable. Accordingly, in the conventional blur correction device, accurate movement control of the imaging element has to be performed.

In order to perform image blur correction, techniques described in, for example, Jpn. Pat. Appln. KOKAI Publication No. 2006-31027 and Jpn. Pat. Appln. KOKAI Publication No. 2007-58089 are known.

An image stabilization system described in Jpn. Pat. Appln. KOKAI Publication No. 2006-31027 includes an assembly moved in response to the camera movement, a plate, and a magnet attached to the plate in such a manner that the magnet constitutes a part of a linear motor, and a line of action of the linear motor passes substantially the same position as the position of the center of gravity of the movable assembly, whereby the camera shake associated with the sway of the camera in which photography is in progress is reduced.

An image blur correction device described in Jpn. Pat. Appln. KOKAI Publication No. 2007-58089 is provided with an arcuate coupling section to which elasticity is imparted by being bent into an arcuate shape along a surface thereof at a part for coupling a CCD on a flexible circuit board and a liquid crystal display and the like to each other, and in which when the CCD moves in a first direction perpendicular to the optical axis of the lens system, or in a direction perpendicular to the optical axis of the lens system, and perpendicular to the first direction, the CCD is allowed to move by the deformation of the curved shape at the arcuate coupling section.

BRIEF SUMMARY OF THE INVENTION

Accordingly, an object of the present invention is to provide a photographic lens unit in which it is easily possible to make an optical axis of the photographic lens unit and an optical axis center of a liquid crystal optical element coincide with each other without making the size of the unit large, and an electronic apparatus using the photographic lens unit.

Thus, an object of the present invention is to provide a photographic lens unit comprising:

photographic lenses fixed inside a lens barrel frame of a lens unit and including a liquid crystal optical element constituted of a plurality of transparent electrode plates which are held in a liquid crystal lens holder;

an imaging element arranged on the image side of the photographic lenses, for converting an optical image into an electric signal;

a board including an opening section on an optical axis of the photographic lenses;

an imaging element holder for holding the imaging element; and a two-dimensional drive mechanism capable of driving the imaging element holder in directions perpendicular to the optical axis of the photographic lenses with respect to the board, wherein a liquid crystal lens holder includes a first retention member and a second retention member, the first retention member includes a first positioning section for performing positioning in an X-Y plane perpendicular to an optical axis of the liquid crystal optical element, and a second positioning section for specifying an optical axis direction, and the second retention member includes a connection section covering the liquid crystal optical element, and connecting with the second positioning section.

Further, another object of the present invention is to provide a photographic lens unit comprising:

photographic lenses including a liquid crystal optical element;

an imaging element arranged on the image side of the photographic lenses, for converting an optical image into an electric signal;

a board including an opening section on an optical axis of the photographic lenses;

an imaging element holder for holding the imaging element;

a support section for supporting the imaging element holder with respect the board;

a liquid crystal lens holder for holding the liquid crystal optical element in the optical axis direction, provided with a convex section formed on the exit surface side of the liquid crystal optical element; and a main body section for fixing the support section, and positioning the liquid crystal optical element by being provided with a concave section to be engaged with the convex section of the liquid crystal lens holder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A to 3C are views showing details of a liquid crystal lens $20_2$ of FIG. 2B in a disassembling manner.

FIGS. 4A and 4B are views showing details of the liquid crystal lens $20_2$ of FIG. 2B in a disassembling manner.

DETAILED DESCRIPTION OF THE INVENTION

Figure 1:
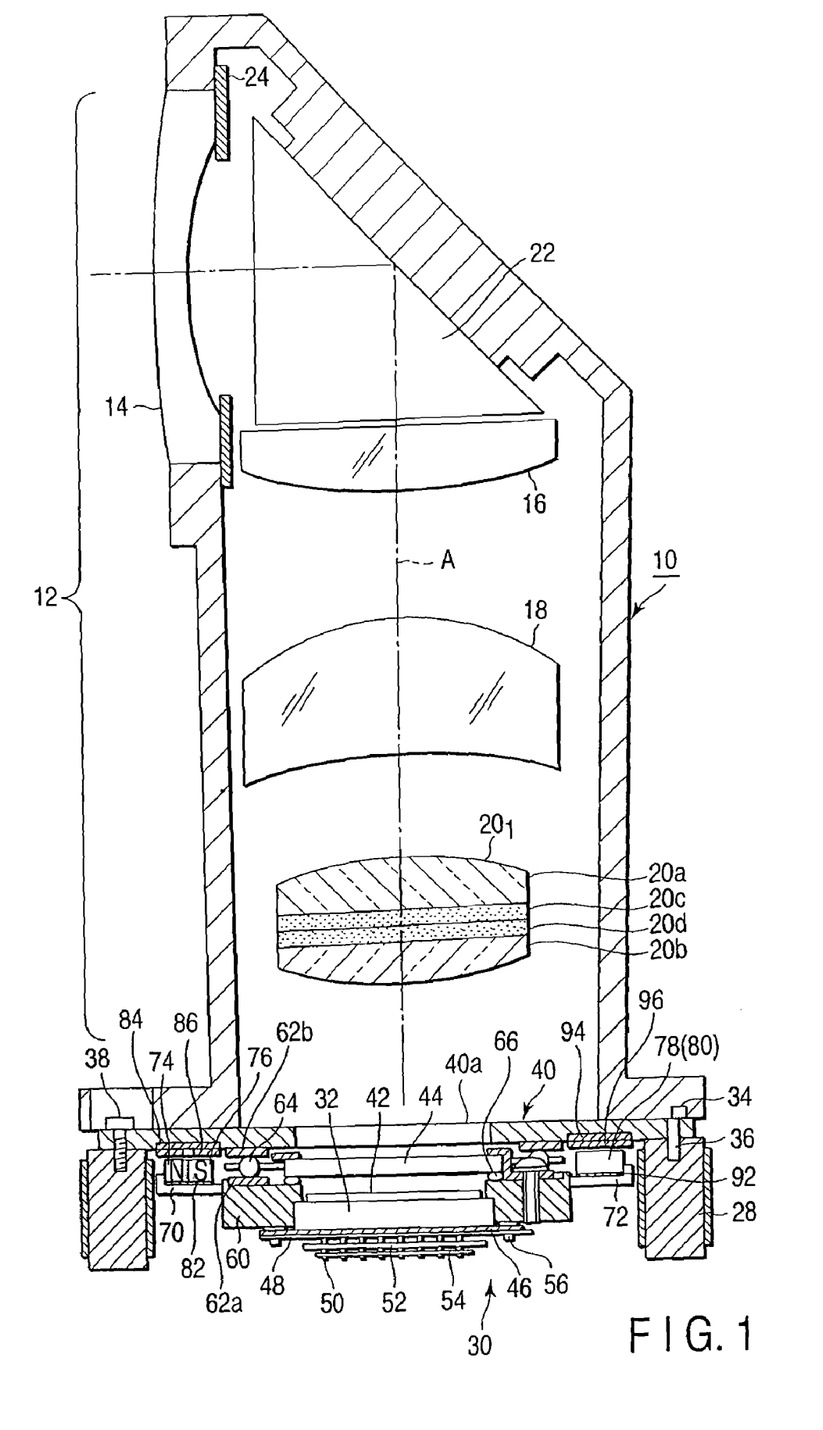
FIG. 1 is a cross-sectional view of a photographic lens unit in which an imaging element module used for a compact camera is used according to a first embodiment of the present invention taken along a light beam.

Embodiments of the present invention will be described below with reference to the accompanying drawings.
(First Embodiment)
FIG. 1 is a cross-sectional view of a photographic lens unit in which an imaging element module is used according to a first embodiment of the present invention taken along a light beam.

For example, a lens unit 10 for a compact camera is provided with photographic lenses 12. The photographic lenses 12 are configured to include a first lens 14 provided with a stop 24 located on the image side thereof, a second lens 16, a third lens 18, and a fourth lens $20_1$. Between the first lens 14 and the second lens 16, a rectangular prism 22 is provided. The rectangular prism 22 downwardly deflects an optical axis A of the photographic lenses 12 at right angles between the first lens 14 and the second lens 16. In a digital camera, a thickness of the lens unit 10 in the object direction is prevented from becoming large by deflecting the optical axis of the photographic lenses 12 as described above, whereby reduction in thickness of the camera main body is achieved.

As described above, the second lens 16 is coupled to a lens barrel frame provided in the lens unit 10 in close proximity to the rectangular prism 22. The third lens 18 moves along the optical axis at the time of a zooming operation for changing the photographic magnification. Further, the fourth lens $20_1$ including a liquid crystal element is fixed to a lens holder (not shown) (the fourth lens $20_1$ does not move in the optical axis direction). The fourth lens $20_1$ is constituted of, for example, a transparent substrate (not shown) arranged between incidence side and exit side lenses 20a and 20b, and liquid crystal optical elements (first liquid crystal lens) 20c, and (second liquid crystal lens) 20d using two diffractive liquid crystal elements. Each of the liquid crystal optical elements 20c and 20d is constituted of a diffractive liquid crystal element used for autofocus or the like, or a diffractive liquid crystal element and a lens. (In FIG. 1, a configuration in which a diffractive or Fresnel liquid crystal element including lenses or a lens arranged on the incidence side and exit side of a diffractive or Fresnel liquid crystal element or arranged on one of the incidence side and exit side thereof, and a lens are combined with each other is called a liquid crystal optical element.)

An operation changes in response to a state where an AC voltage is not applied to the liquid crystal lens made up of two diffractive liquid crystal optical elements, and to a state where an AC voltage is applied to the liquid crystal lens. In the first liquid crystal lens 20c and the second liquid crystal lens 20d, the light distribution directions are perpendicular to each other.

When an AC voltage is not applied to the first liquid crystal lens 20c, the liquid crystal functions as an ordinary index irrespectively of a light polarization direction of a light beam incident thereon. The refractive index of the substrate and the ordinary index of the liquid crystal are equal to each other, and hence the liquid crystal lens exhibits a non-polarization function irrespectively of a light polarization direction of the incident light beam.

When an AC voltage is applied to the second liquid crystal lens 20d, the second liquid crystal lens 20d functions as an extraordinary index with respect to P-polarization, and the P-polarization is diffracted (deflected). On the other hand, the first liquid crystal lens 20c functions as an ordinary index with respect to S-polarization, and the S-polarization is not diffracted (deflected). When an AC voltage is applied to the first liquid crystal lens 20c, the first liquid crystal lens 20c functions as an extraordinary index with respect to S-polarization, and the S-polarization is diffracted (deflected). The fourth lens $20_1$, made up of the first and second liquid crystal lenses 20c and 20d, is fixed to the inner wall of the lens unit 10 by means of a crystal lens holder, which is to be described below.

The lens unit 10 is positioned with respect to a camera main body 28 in which an imaging element 32, and an imaging element unit 30 supporting the imaging element 32 are held beneath the photographic lenses 12. The lens unit 10 is positioned by means of positioning pins 34 in such a manner that the center of the opening of a base plate 40 (referred to as a substrate) and the optical axis of the photographic lens align with each other. The bottom surface of the lens unit 10 is bonded to the base plate 40 by means of an adhesive.

The imaging element 32 is provided with a light receiving surface on which a plurality of photoelectric conversion elements for accumulating an electric charge corresponding to the received light amount are arranged. Further, an optical object image formed on the light receiving surface by the photographic lenses 12 is converted into an electric imaging signal, and the imaging signal is output, whereby imaging is performed. The imaging element 32 is arranged on the camera main body 28 constituting a bottom of the lens unit 10 through an electromagnetic drive mechanism in a state where the light receiving surface is made perpendicular to the photographic optical axis.

The lens unit 10 is fixed to the camera main body 28 through a bottom board 40 including an opening part 40a by means of the positioning pins 43 and 36, and screw 38. The opening part 40a is formed to guide the incident light from the photographic lenses 12 to the imaging element 32. A protective plate (cover glass) 42 is provided on the light receiving surface of the imaging element 32. Further, between the imaging element 32 and the bottom board 40, an optical low-pass filter 44 is provided.

Further, the imaging element 32 is attached to a radiator plate 46 constituted of an aluminum material or the like. A heat radiation sheet 48 is provided on the back side of the radiator plate 46. Connection terminals 50 of the imaging element 32 are connected to a printed circuit board 52 and a flexible printed circuit board (FPC board) 54 by soldering. Further, the radiator plate 46 and the heat radiation sheet 48 to which the imaging element 32 is attached are positioned by means of positioning pins 56, whereby the imaging element 32 is positioned.

The imaging element unit 30 is configured to include, for example, a bottom board 40 (called a board) constituted of a printed circuit board, an imaging element support plate 60 which is an imaging element holder to which the imaging element 32 is attached to be opposed to the bottom board 40, and a support section. The imaging element support plate 60 is provided with a guide bearing 62a, which is opposed to a guide bearing 62b provided on the bottom board 40. The pair of guide bearings 62a and 62b, and steel balls 64 interposed between the guide bearings 62a and 62b constitute the support section. Each of the pair of guide bearings 62a and 62b is constituted of a rectangular metallic material having high surface hardness, and a thickness of about 1 mm (for example, a steel material subjected to hardening).

On the front surface side of the imaging element 32 fixed to the imaging element support plate 60, a sealing member 66 is interposed between the optical low-pass filter 44 and the imaging element support plate 60. The sealing member 66 is formed of black elastic rubber. An attachment member to which the optical low-pass filter 44 is fixed is fixed to the imaging element support plate 60 by means of small screws, whereby the sealing member 66 is squashed. As a result of this, a structure in which the protective sheet of the imaging element 32, and the exit surface of the optical low-pass filter 44 are protected from dust is obtained.

First permanent magnets 74 and 76, and second permanent magnets 78 and 80 which are magnetized in a plurality of thickness directions, and are combined with each other in such a manner that both the first permanent magnets 74 and 76 are combined with each other, and both the second permanent magnets 78 and 80 are combined with each other with the different poles opposed to each other are arranged on protrusion members 70 and 72 outwardly extended from an upper part of the imaging element support plate 60, respectively. Further, on the bottom board 40, a printed coil 86 and 96 for drive along the X- or Y-axis is arranged to sandwich a magnetic material 82 and 94.

Magnetic pressing force (magnetic attractive force) is applied to the guide bearings 62a and 62b including a retainer and at least four steel balls at a part between at least each of the pairs of permanent magnets 74 and 76, and 78 and 80, and the magnetic material 82 and 94 of the bottom board 40. When the pressing force is applied, the steel ball of the guide bearings 62a and 62b are pressed against the imaging element support plate 60 and the bottom board 40. As a result of this, the rattle of the steel balls 64 interposed between the guide bearings 62a and 62b provided between the imaging element support plate 60 and the bottom board 40 is eliminated.

On the protrusion member 70 of the imaging element support plate 60, the first permanent magnets 74 and 76 are arranged through a magnetic material 82. The permanent magnets 74 and 76 are polarization-magnetized in such a manner that an N pole and an S pole of each of the first permanent magnets magnetized in the thickness direction are arranged in the extension direction of the FPC board 52 at a position opposed to the printed coil 86 for X-axial drive bonded to the bottom board 40 through a magnetic material 84.

Further, the printed coil 96 for Y-axial drive bonded to the bottom board 40 through a magnetic material 94 has an oblong rectangular shape, and is arranged in such a manner that long sides thereof are opposed to the magnetic poles of the second permanent magnets 78 and 80 through a magnetic material 92 on the protrusion member 72. Likewise, the printed coil 86 for X-axial drive has an oblong rectangular shape, and is arranged in such a manner that long sides thereof are opposed to the magnetic poles of the first permanent magnets 74 and 76.

In this embodiment, a Hall element is arranged inside the printed coil 86 or 96 for X- or Y-axial drive, and a support section utilizing the magnetic attractive force is constituted between the imaging element support plate 60 using the guide bearing 62 having the retainer, and the magnetic material 82, 94 of the bottom board 40. However, when a bearing is formed on the imaging element support plate 60 side and a guide shaft is provided on the bottom board 40 side without using the magnetic material 82 and 94, a support section using a metallic material having a configuration in which an intermediate member movable along one axis is arranged between the imaging element support plate 60 and the bottom board, and the imaging element support plate 60 moves in a direction perpendicular to the movement direction of the intermediate member may be employed.

Further, here, although one set of the first and second permanent magnets are used, it is also possible to employ the arrangement in which four permanent magnets are positioned on diagonal lines, four printed coils for drive are positioned on the bottom board 40 to be opposed to the permanent magnets, and magnetic pieces are arranged at back side positions of the printed coils for X- and Y-axial drive on the opposing extension lines of the printed coils for X- and Y-axial drive. Further, it is also possible to attach the magnetic pieces to positions on the printed coils for X- or Y-axial drive, and opposed to positions in the vicinity of central parts of the permanent magnets 74 and 80 in the longitudinal direction of the magnets 74 and 80. When the electric current supply to the printed coils 86 and 96 for X- and Y-axial drive is stopped, the imaging element support plate 60 returns to the initial position at which the optical axis of the photographic lenses and the center of the movable imaging element 32 coincide with each other by the magnetic balance of the permanent magnet and the magnetic piece.

Furthermore, the coils for X- and Y-axial drive are arranged on the bottom board of the printed circuit board, and the permanent magnets are arranged on the imaging element support plate side. However, conversely, the coils for X- and Y-axial drive, and the magnetic materials may be arranged on the imaging element support plate side, and the four permanent magnets may be arranged on the bottom board.

A CPU (not shown) for performing position control of the imaging element support plate 60 supporting the imaging element 32 includes a drive circuit arranged on the printed circuit board 52. The CPU controls the drive circuit for driving the movement of the imaging element support plate 60 along the X-axis which is the horizontal, and the movement of the plate 60 along the Y-axis which is the vertical.

The CPU performs control of moving the imaging element support plate 60 to a desired position on the basis of an angular velocity input thereto from a gyro (not shown). When the printed coil 96 for X-axial drive in the horizontal direction is energized in the magnetic flux of the permanent magnets bonded to each other with the different poles opposed to each other arranged on the imaging element support plate 60, and the imaging element support plate 60 is moved, position detection is performed by the Hall element arranged inside the printed coil. Further, when the electric current supply to the printed coil 96 for X-axial drive is stopped, the imaging element support plate 60 returns to the initial position at which the optical axis of the photographic lenses and the center of the movable imaging element coincide with each other by the magnetic balance of the permanent magnet 80 and the magnetic piece.

Likewise, the CPU (control circuit, controller) performs control of moving the imaging element support plate 60 to a desired position on the basis of an angular velocity input thereto from a gyro (not shown). When the printed coil 86 for Y-axial drive in the vertical direction is energized in the magnetic flux of the permanent magnets 74 and 76 bonded to each other with the different poles opposed to each other arranged on the imaging element support plate 60, and the imaging element support plate 60 is moved, position detection is performed by the Hall element arranged inside the printed coil 86.

When the electric current supply to the printed coil 86 for Y-axial drive is stopped, the imaging element support plate 60 can return to the initial position. However, as will be described later, when the user uses the apparatus, if a locking mechanism constituted of a clip arranged on the lower side of the apparatus (see FIG. 5) is used, the initialization is made unnecessary by the magnetic balance of the magnet and the magnetic piece. Here, the arrangement of a temperature sensor is omitted.

In this way, when the lens unit 10 vibrates, the imaging element 32 on the movable imaging element support plate 60 moves in two dimensions, whereby it is possible to correct the shake of the image on the light receiving surface of the imaging element 32.

It should be noted that in the embodiment, the two-dimensional drive mechanism is not limited to the mechanism using the DC linear motor. It may be an electromagnetic driving motor made of a stepping motor or the like, or may be of a system in which drive is performed by using a piezoelectric element drive motor, a bending vibration motor or a shape memory alloy spring as the drive source.

Next, a detailed configuration of the fourth lens $20_1$ of FIG. 1 will be described below with reference to FIG. 2A.

Figure 2A:
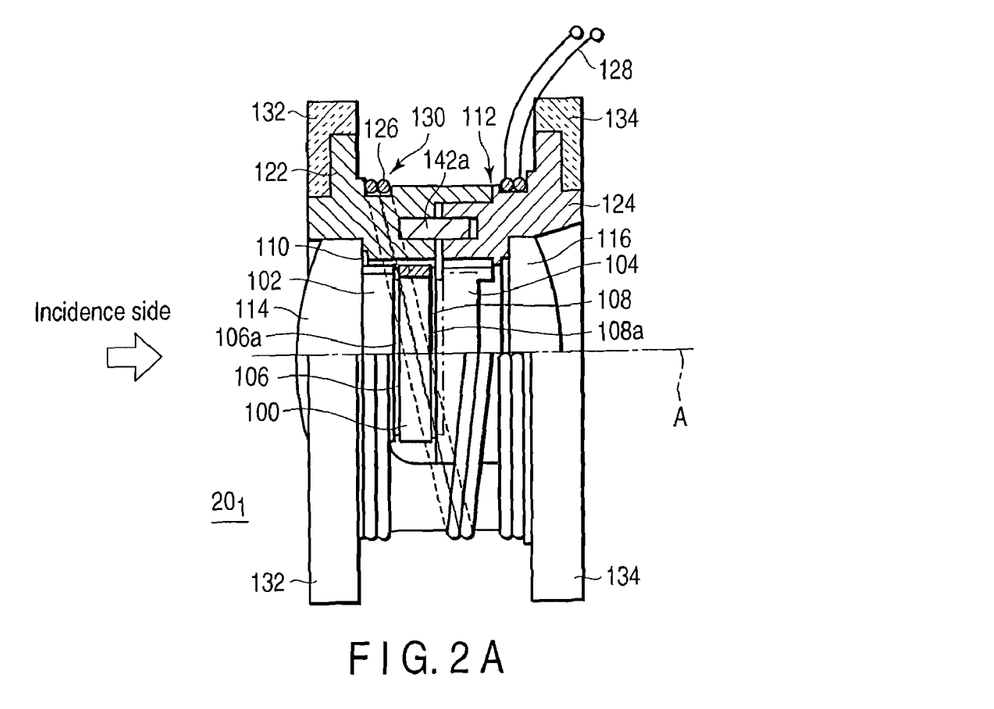
FIG. 2A is a view for explaining a detailed configuration of a fourth lens $20_1$ of FIG. 1.

In FIG. 2A, the fourth lens $20_1$ is configured as a liquid crystal lens, and a liquid crystal lens 100 is provided at a central part thereof. In the liquid crystal lens 100, although not shown here, a fourth lens group frame for a zooming or autofocus operation is arranged at a fixed position without obstructing an incident light from an object to be photographed.

Further, the liquid crystal lens 100 uses a nematic liquid crystal material such as a diffractive liquid crystal or Fresnel liquid crystal material, and is constituted of a liquid crystal lens including a refractive surface at which the refractive index can be changed with the refractive index of the transparent first substrate 102 or transparent second substrate 104 being the border. In the fourth lens $20_1$, the magnitude of a voltage to be applied to the liquid crystal lens 100 is adjusted through electrode terminals 106 and 108 provided between the liquid crystal lens 100 and the first substrate 102, and between the liquid crystal lens 100 and the second substrate 104, whereby focus adjustment, and correction of the image surface are performed. That is, in the liquid crystal lens 100, in order to apply the voltage to the nematic liquid crystal, transparent electrodes are formed on the orientation film on the first substrate 102 side, and on the orientation film on the second substrate 104 side. It is known that in the fourth lens $20_1$, the autofocus and image surface correction are generally enabled. Further, in the liquid crystal lens 100 constituted of the nematic liquid crystal material, the internal space thereof is sealed by a sealing material 110.

At the time of assembly, the liquid crystal lens 100 is inserted between the electrode terminals 106 and 108, and an abutting plane 112 for positioning in the direction of the optical axis is provided so as to bond the lens 100 to the electrode terminals 106 and 108. Further, outside the first substrate 102, and the second substrate 104, a lens 114, and lens 116 are arranged respectively.

Around the electrode terminals 106 and 108, first and second substrates 102 and 104, and lenses 114 and 116, first and second retention members 122 and 124 (which are called lens holders) serving as retention members for retaining the above elements are provided. On the outer circumferential surface of the first and second retention members 122 and 124, a groove section 130 for embedding therein a metallic wire (thermal conductor) 126 for heating the liquid crystal lens 100 is formed. That is, the metallic wire 126 is wound around the liquid crystal lens 100 through the first and second retention members 122 and 124.

The metallic wire 126 is provided for the purpose of preheating the liquid crystal lens 100 in order to prevent the lens 100 from being deteriorated in sensitivity by the low temperature. Further, the metallic wire 126 is connected to output terminals of a thermostatic switch on a board (not shown) through the wiring 128. An input terminal of the thermostatic switch is configured to receive a metallic wire 186 connected to the clip 188 shown in FIG. 5 to be described later.

Particularly, in a low-temperature environment (for example, below 10° C.), the radiator plate 46 is clamped by the clip 188, the imaging element 32 is driven, heat is conducted from the clip to the metallic wire 126 through the metallic wire 77, and when the thermostatic switch has reached a predetermined temperature, the first and second retention members 122 and 124 can be warmed. When the ambient temperature of the liquid crystal lens 100 becomes higher than 10° C., the thermostatic switch is turned off, and the drive of the imaging element 32 is stopped.

It should be noted that the liquid crystal lens 100 may have a structure in which the lens 100 is constituted of, for example, three transparent substrates and two thin diffractive liquid crystal lenses 100 that are stacked in parallel with each other. At this time, the diffractive or Fresnel liquid crystal lenses are arranged on both the front side and back side of the central transparent substrate.

Further, as for the metallic wire 126, here, the duplicated wires are embedded in one groove section 130 as a pair. However, the configuration is not limited to this. For example, as the fourth lens $20_2$ shown in FIG. 2B, a single wire 126 may also be arranged in one groove section 130a, or two or more metallic wires 126 may be arranged in one groove section.

The first retention members 122 and 124 are fixed, together with thermal insulation members 132 and 134, to the inside of a lens-barrel frame in the lens unit 10 by means of the thermal insulation members 132 and 134. The thermal insulation members 132 and 134 are provided to prevent, at the time of a low temperature, the external temperature from being conducted to the liquid crystal lens 100, or prevent the temperature to which the liquid crystal lens is heated from being conducted to the outside. Accordingly, the part between the liquid crystal lens 100 and the lens unit 10 is configured to prevent heat from being conducted to/from the liquid crystal lens 100 from/to the lens unit 100 by the thermal insulation members 132 and 134.

Figure 2B:
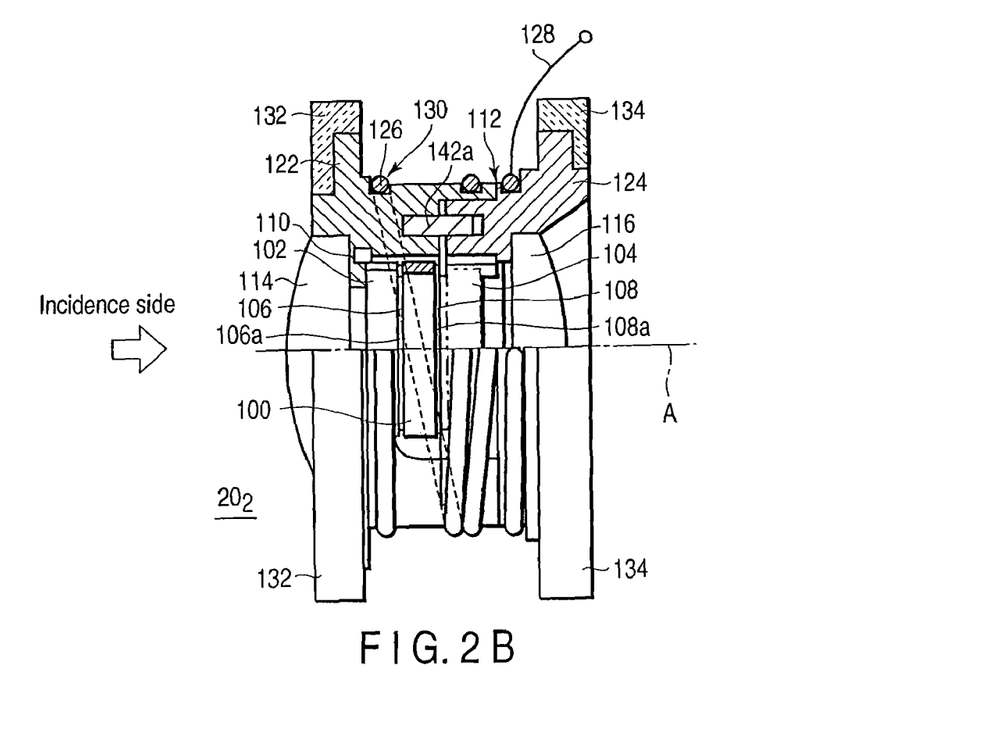
FIG. 2B is a view showing a modification example of FIG. 2A.
Figure 3A:
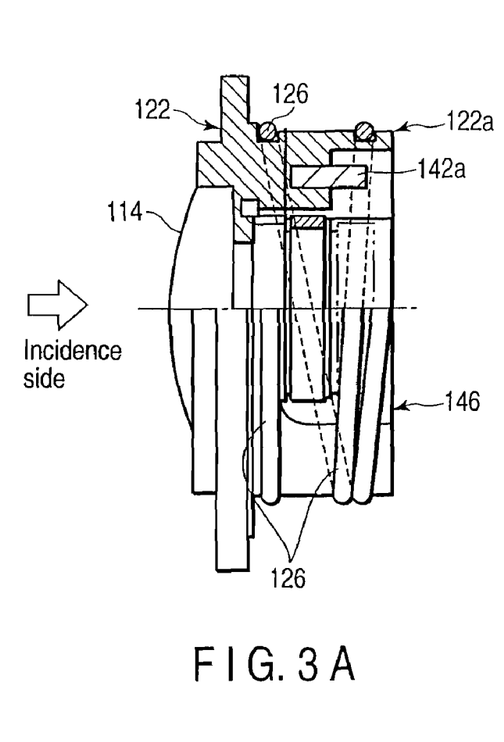
FIG. 3A is a view showing a first retention member 122.
Figure 3B:
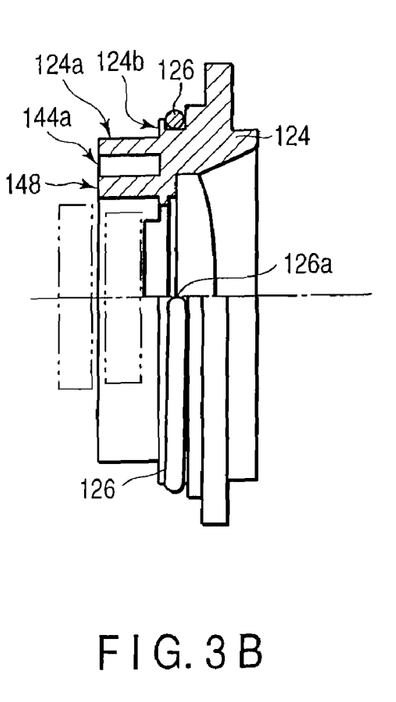
FIG. 3B is a view showing a second retention member 124.
Figure 3C:
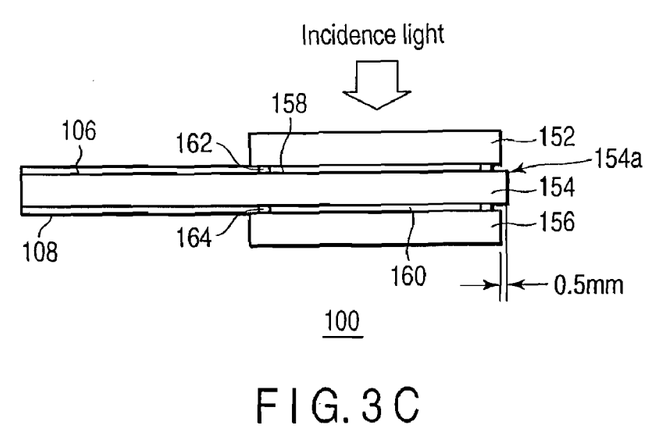
FIG. 3C is a view showing the structure of a liquid crystal lens 100.

FIGS. 3A to 3C, and FIGS. 4A and 4B each show details of the fourth lens $20_2$ of FIG. 2B in a disassembling manner. FIG. 3A is a view showing the first retention member 122, FIG. 3B is a view showing the second retention member 124, and FIG. 3C is a view showing the structure of the liquid crystal lens 100.

Figure 4A:
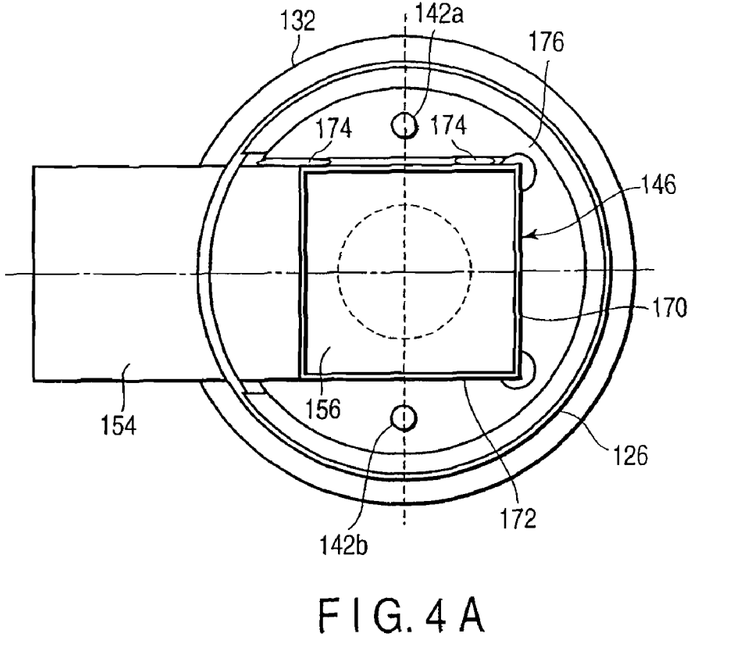
FIG. 4A is a plan view of the first retention member 122 viewed from the second retention member 124 side.
Figure 4B:
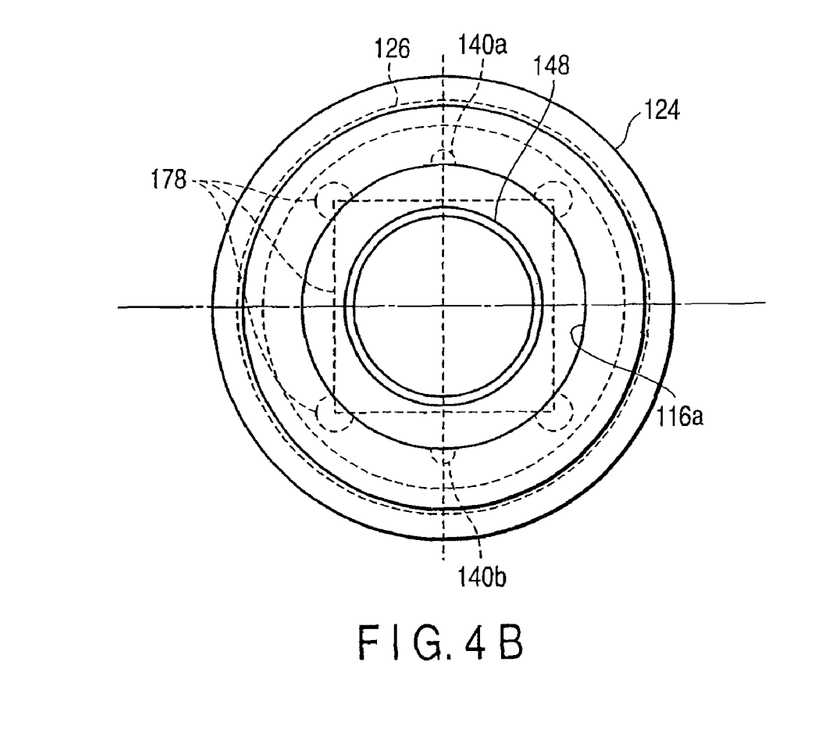
FIG. 4B is a plan view of the second retention member 124 viewed from the first retention member 122 side.

FIG. 4A is a plan view of the first retention member 122 viewed from the second retention member 124 side, and FIG. 4B is a plan view of the second retention member 124 viewed from the first retention member 122 side.

On the incident light side of the first retention member 122, the lens 114 is retained. At the time of assembly completion, a gap is present between the lens 114 and the incidence plane of the transparent substrate 102, and a concave section 144a and a positioning section 148 are formed in the second retention member 124 in order to position the optical axis direction of the fourth lens $20_2$. When the fourth lens $20_2$ is bonded to the first positioning means (having a recess at a corner part of the concave section) in the first retention member, the positioning is performed in the optical axis direction and in a plane perpendicular to the optical axis direction. The first retention member 122 is provided with two positioning pins 142a and 142b parallel with the optical axis of the projection lens serving as a second positioning section.

The first retention member 122 is provided with a protrusion section 122a, and a step section 124a is provided inside the second retention member 124. Further, when the second retention member 124 is inserted in the first retention member 122, the protrusion section 122a and the step section 124b are brought into a loosely fitted state. When the positioning hole 144a of the second retention member 124 is fitted on the positioning pin 142a of the first retention member 122, the positioning pin 142a being the basis of the insertion, it is possible to make the outer circumferential surface of the first retention member 122, and the outer circumferential surface of the second retention member flush with each other. It should be noted that the part 124b shown in the drawing is a joint surface of the second retention member 124 at which the member 124 is joined to the first retention member 122, and a part 126a is an end part of the metallic wire.

As shown in FIG. 3C, the liquid crystal lens 100 is constituted of the three transparent electrode substrates, and the two layers of diffractive liquid crystal lenses (liquid crystal layers). In FIG. 3C, the transparent electrode substrates are constituted of, in the order from the incidence side, a first transparent electrode substrate 152, second transparent electrode substrate 154, and third transparent electrode substrate 156. Further, between each of the substrates, liquid crystal layers 158 and 160 are provided together with spacers 162 and 164. Further, the second transparent electrode substrate 154 is formed longer than the first and third transparent electrode substrates 152 and 156 as a lead electrode, and the end part 154a thereof on the opposite side of the lead is protruded from the end parts of the first and third transparent electrode substrates 152 and 156 by, for example, 0.5 mm.

As shown in FIG. 4A, the liquid crystal lens 100 configured as described above is placed in the first retention member 122. That is, the end part 154a of the second transparent electrode substrate 154 is brought into contact with an opening section 146 formed in the first retention member 122, whereby the end part 154a is positioned. At this time, the X-axis is determined by the positioning reference surface 170, and the Y-axis is determined by the positioning reference surface 172. It should be noted that each part 174 shown in FIG. 4A is an adhesive for bonding the liquid crystal 102 to the first retention member 122, and a part 176 and parts 178 are recess holes of the transparent electrode substrate. Further, a reference symbol 116a denotes the fitting section of the lens 116.

As described above, when the first and second retention members 122 and 124 on which the lenses 114 and 116, and the liquid crystal lens 100 are positioned are inserted in the lens unit 10 through the thermal insulation members 132 and 134, the position of the liquid crystal lens associated with the lens unit 10 is also determined. Accordingly, it is possible to easily position the optical axis connecting the lenses 114 and 116, and the center of the liquid crystal to each other.

Further, here, the plurality of positioning pins 142a and 142b are provided on the first retention member 122, and positioning holes 144a and 144b are formed in the second retention member 124. However, the liquid crystal lens 100 may be bonded to the second retention member 124, the positioning pins 142a and 142b may be provided on the second retention member 124, and the positioning holes 144a and 144b may be formed in the first retention member 122.

It should be noted that although not shown, it is also possible to replace the liquid crystal lens 100 described previously with a liquid lens in which the inside of the transparent first and second substrates 102 and 104 is filled with, for example, oil and an electrolyte of a fluid, an insulator and a transparent electrode are formed on the outside of each of the first and second substrates 102 and 104, a voltage is applied to the electrolyte of the fluid, and the shape of the boundary surface between the electrolyte and the oil changes, thereby changing the focal length.

(Second Embodiment)

Next, a second embodiment of the present invention will be described below.

Figure 5:
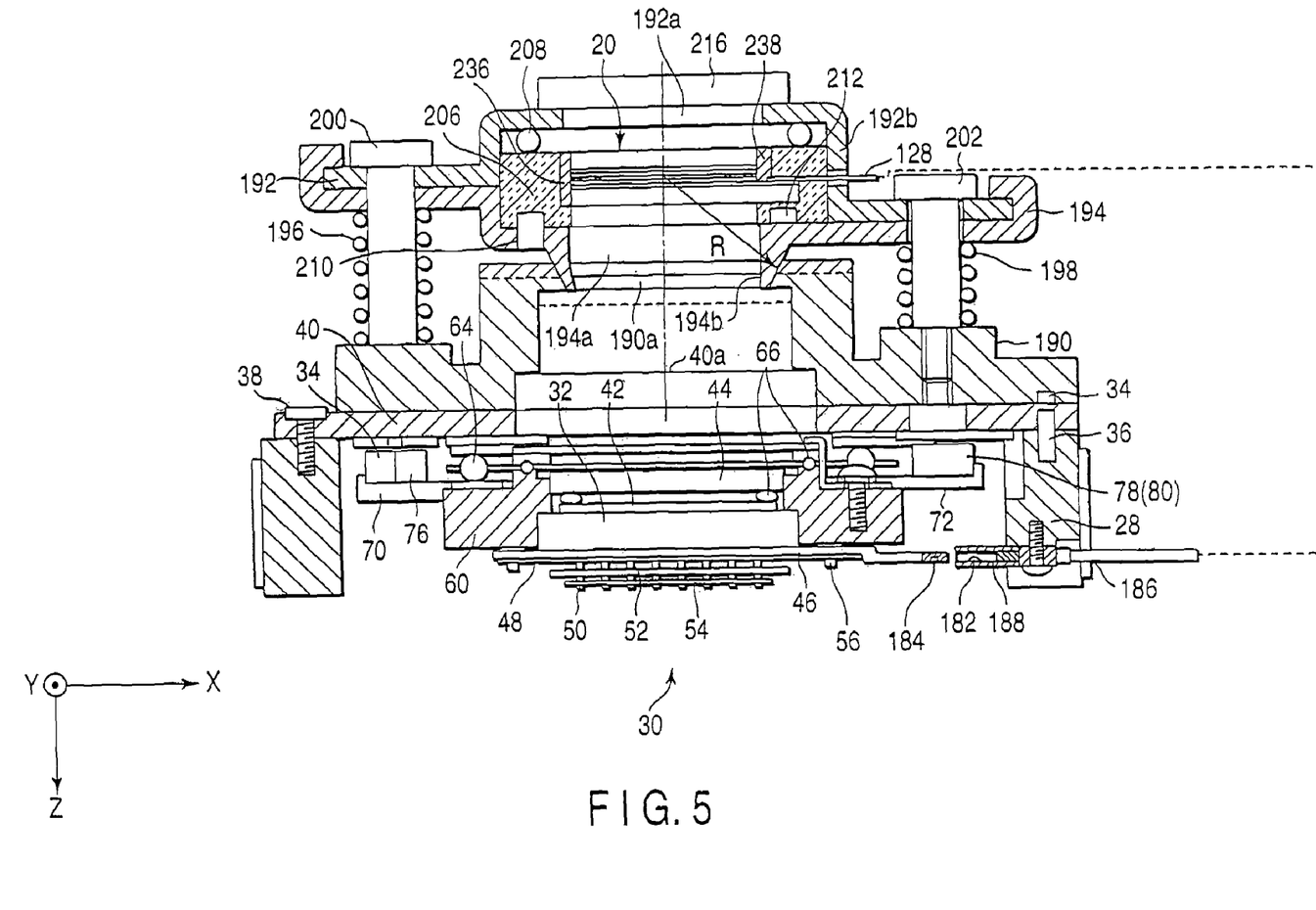
FIG. 5 is a cross-sectional view of a photographic lens unit in which an imaging element module used for a compact camera is used according to a second embodiment of the present invention taken along a light beam.

FIG. 5 is a cross-sectional view of a photographic lens unit in which an imaging element module used for, for example, a compact camera is used according to a second embodiment of the present invention taken along a light beam.

It should be noted that in the embodiment to be described below, parts identical with those of the first embodiment described previously are denoted by the reference symbols identical with those of the first embodiment, an illustration and description of them are omitted, and only parts different from those of the first embodiment will be described.

In FIG. 5, in an imaging element unit 30, a radiator plate 46 to which an imaging element 32 is attached is formed in such a manner that an end thereof is extended. In the vicinity of the extended distal end section of the radiator plate 46, a locking recess section 184 for engaging with a protrusion pin 182 to be described later, and locking the pin 182 is formed.

A metallic wire 186 such as a copper wire or the like for radiating heat from the radiator plate 46 is fixed to a camera main body 28 by screwing. A distal end section of the metallic wire 186 is provided with a clip 188 including a protrusion pin 182 formed in the inside thereof. In FIG. 5, the clip 188 is moved leftwardly, and the distal end section of the radiator plate 46 is inserted in the clip 188. Then, by engaging of the protrusion pin 182 with the locking recess section 184, the radiator plate 46 and the metallic wire 186 are joined to each other. As a result of this, the heat generated from the imaging element 32 is conducted to the metallic wire 186.

Further, when the imaging element unit is provided with the radiator plate for conducting heat from the imaging element, and the main body section is provided with the clip section, an electronic apparatus in which the radiator plate can be clamped at the time of power-off such as transportation and the like is obtained.

The photographic lens unit main body 190 is fixed to the camera main body 28 through the bottom board 40 by means of the positioning pins 34 and 36, and screw 38. Further, the photographic lens unit main body 190 is provided with a first retention frame A192 and second retention frame B194 so that they can be moved in the optical axis direction of the photographic lenses. The first and second retention frames A192 and B194 are fastened to the photographic lens unit main body 190 by means of a retaining stopper 200, and adjusting screw 202 around outer circumferential surfaces of which springs 196, and 198 are wound, respectively.

Each of the first and second retention frames A192 and B194 is constituted of a molded article of plastic such as PPS resin and polycarbonate filled with carbon. It should be noted that in FIG. 5, although only one adjusting screw 202 is shown, a plurality of (for example, three) adjusting screws 202 with which stoppers 200 are replaced are actually present. However, the number of the adjusting screws is not limited to this.

Inside the first and second retention frames A192 and B194, a liquid crystal lens holder 206 for supporting a liquid crystal lens 20 which is a liquid crystal optical element is provided. The liquid crystal lens holder 206 is constituted of a thermal insulation member, a cross-sectional shape thereof is circular, and is pressed in the optical axis direction by an annular O-ring. Further, the liquid crystal lens holder 206 is positioned and fixed to the second retention frame B194 by means of positioning pins 210 and 212. The liquid crystal lens holder 206 includes a first positioning section for positioning the liquid crystal lens 20 in the X-Y plane perpendicular to the optical axis. The shape of the first positioning section is identical with the positioning pin shown in FIG. 2B.

Further, the first retention frame A192 including a connection surface connecting with a second positioning section (top surface of the first retention frame A192) is configured as the second retention frame.

The first retention frame A192 is provided with an opening 192a for guiding incident light from the object (not shown) to the imaging element 32, and a hole 192b for passing therethrough a metallic wire 128 for supplying preheat to the first and second retention frames A192 and B194. Further, an acrylic plate 216 for covering the opening 192a to prevent dust or the like from entering the liquid crystal lens 20 and imaging element 32, and an O-ring are provided.

On the other hand, the second retention frame B194 is provided with an opening 194a at a position opposed to the exit side surface of the liquid crystal lens 20, and a downwardly formed convex section 194b. Further, the photographic lens unit main body 190 is provided with a concave section 190b for positioning the liquid crystal lens 20 at a position opposed to the convex section 194b. It should be noted that an opening 190a is provided at a central part of the concave section 190b.

A contact surface of the convex section 194b of the second retention frame B194, and a contact surface of the concave section 190b of the photographic lens unit main body 190 are formed by a predetermined radius R having a center thereof in the vicinity of the refracting surface of the liquid crystal lens 20 as shown in FIG. 5. As a result of this, the concave section 190b constitutes a spherical bearing. It should be noted that the contact surface may be formed as a surface having a predetermined taper angle and, in this case, the concave section 190b constitutes a conic surface bearing.

For example, when the external shape of the second retention frame B194 is used as the reference, the guide surface becomes small, and the incidence and exit surfaces of the liquid crystal lens 20 retained inside are tilted, which causes deterioration in performance. In order to prevent the tilt, the surface of the above-mentioned spherical bearing perpendicular to the optical axis or, for example, an attaching surface of a fabricated support is used as a contact surface, whereby more stable retention is obtained. This improves the tilt of the liquid crystal surface with respect to the optical axis.

It should be noted that the liquid crystal lens 20 is inserted by using the second retention frame B194 as the reference, the liquid crystal lens 20 is covered by the first retention frame A192, and is pressed in the optical axis direction by means of the O-ring 208, whereby more stable retention is obtained.

Further, between the liquid crystal lens 20 and the liquid crystal lens holder 206, spacers 236 and 238 are inserted. By virtue of the spacers 236 and 238, it becomes possible to adjust the exit surface of the liquid crystal lens 20 in the direction perpendicular to the optical axis of the photographic lens.

In such a configuration, the convex section 194b of the second retention frame B194 is moved on the spherical bearing of the photographic lens unit main body 190 by adjusting the adjusting screws 202. In this way, the inclination of the optical axis of the liquid crystal lens 20 positioned on the second retention frame B194 is adjusted by adjusting the adjusting screws 202 to make the center of the spherical bearing and the center of the liquid crystal lens 20 coincide with each other.

Adjustment by the adjusting screws is required for the following reasons.

That is, when the movable imaging element 32 is used to correct camera shake, it is required to maintain the parallelism of the surface of the movable imaging element with the main body reference surface, and assure the machining accuracy of the surface perpendicular to the optical axis of the exit side of the liquid crystal lens. Then, the holder for holding the imaging element accompanied by an electromagnetic drive mechanism constituted of a drive coil, a fixed magnet, and the like, and hence fabrication of the imaging element attaching surface is needed. However, in this case, a working process using complicated jigs occurs, leading to an increased cost of the photographic lens unit. Further, when the lens is exchanged, the exit pupil distance is changed. When the focal length is small, the incident light is of oblique incidence in many cases, and light incident on the imaging element decreases. In order to improve this, when the oblique incoming light from the object is made incident on the liquid crystal element, an application voltage is supplied to the liquid crystal element to be distorted, the inclination angle is changed, and the light is condensed on the imaging element. The above are the reasons for the requirement. In such a case, by making the liquid crystal optical element and the center of the imaging element of the CCD shift mechanism coincide with each other, it is possible to prevent a state where although the central part is in focus, the image is blurred at the peripheral part of the imaging element from occurring. Accordingly, the adjustment is performed by means of the adjusting screws 202.

Next, a first modification example of the second embodiment of the present invention will be described below.

Figure 6:
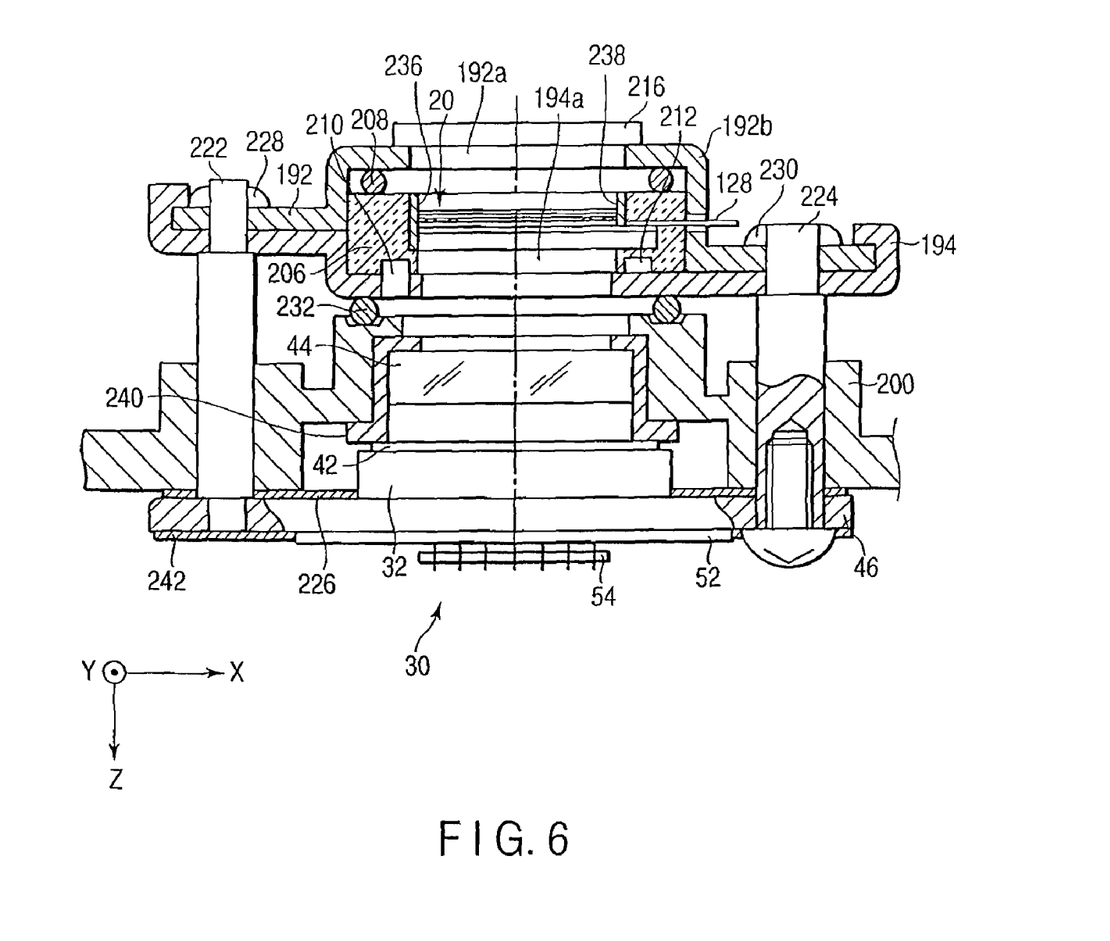
FIG. 6 is a cross-sectional view of a photographic lens unit in which an imaging element module used for an electronic camera with interchangeable lenses is used according to a first modification example of the second embodiment of the present invention taken along a light beam.

FIG. 6 is a cross-sectional view of a photographic lens unit in which an imaging element module used for, for example, an electronic camera with interchangeable lenses is used according to a first modification example of the second embodiment of the present invention taken along a light beam.

In FIG. 6, in the imaging element unit 30, the radiator plate 46 to which the imaging element 32 is attached is fixed to the main body section 200 by means of retaining stoppers 222 and 224. Between the main body section 200 and the radiator plate 46, a spacer 226 having a bracelet-like shape, and having elasticity is inserted so that the angle can be adjusted with respect to the optical axis. Further, to the other ends of the stoppers 222 and 224, a first retention frame A192 and a second retention frame B194 retaining a liquid crystal (a liquid crystal optical element using a diffractive or Fresnel liquid crystal) lens 20 in order to prevent a state where when a lens having a small focal length is used, oblique incidence of light on the imaging element increases, and shading of brightness occurs at the peripheral part of the image plane from occurring, are fixed by means of adhesive 228 and 230.

It should be noted that between the second retention frame B194 and the main body section 200, an annular O-ring 232 having a circular cross-sectional shape is interposed, and is pressed in the optical axis direction. When the spacer 226 is formed by putting elastic rubber on a thin plate spring made of a phosphor bronze material, it is possible to adjust the depression amount of the O-ring, and it is also possible to prevent dust from adhering to the surfaces of the imaging element 32 and optical low-pass filter 44.

Further, between the liquid crystal lens 20 and the liquid crystal lens holder 206, spacers 236 and 238 are inserted. By virtue of the spacers 236 and 238, it becomes possible to adjust the exit surface of the liquid crystal lens 20 in the direction perpendicular to the optical axis of the photographic lens.

The liquid crystal lens holder 206 includes a first positioning section for positioning the liquid crystal lens 20 in the X-Y plane perpendicular to the optical axis. The shape of the first positioning section is identical with that of the positioning pin shown in FIG. 2B.

Further, the first retention frame A192 covering the liquid crystal lens 20 and including a second positioning section (surface at which the stopper 222 and the top surface of the first retention frame A192 are in contact with each other) is configured as the second retention frame.

Furthermore, the optical low-pass filter 44 is fastened to the main body 200 through a sealing member 240. The undersurface of the sealing member 240 is in contact with a top surface of a protective sheet 42. That is, sealing of a double structure for preventing dust from adhering to the surfaces of the protective sheet 42 and the optical low-pass filter 44 is obtained by the sealing member 240.

Further, a heat accumulation sheet 242 formed by laminating a heat accumulation material capable of absorbing heat such as a ceramic sheet and paraffin is attached to the undersurface of the radiator plate 46. An abrupt temperature rise is suppressed by the ceramic sheet or the heat accumulation sheet 242.

By the configuration described above, it is possible to make the center of the liquid crystal and the optical axis center of the photographic lens coincide with each other as in the case of the second embodiment described previously.

Further, in FIG. 6, it is also possible to arrange a liquid crystal in place of the optical low-pass filter between the vibration insulation optical filter or infrared cut filter shown in FIG. 5, a piezoelectric element for vibrating the optical element, and the imaging element.

Next, a second modification example of the second embodiment of the present invention will be described below.

Figure 7:
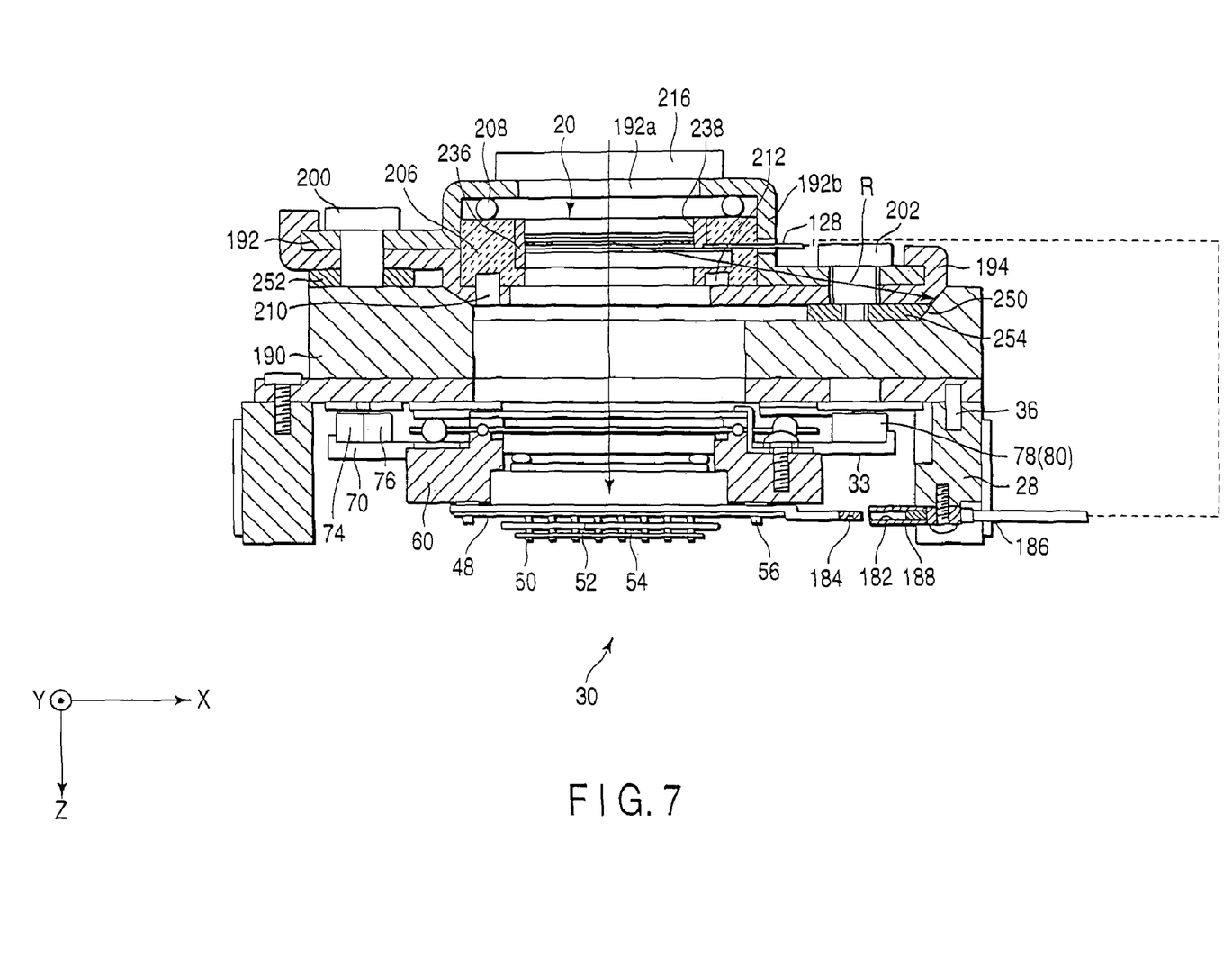
FIG. 7 is a cross-sectional view of a photographic lens unit in which an imaging element module used for an electronic camera with interchangeable lenses is used according to a second modification example of the second embodiment of the present invention taken along a light beam.

FIG. 7 is a cross-sectional view of a photographic lens unit in which an imaging element module used for, for example, an electronic camera with interchangeable lenses is used according to a second modification example of the second embodiment of the present invention taken along a light beam.

It should be noted that in the second modification example of the second embodiment to be described below, parts identical with those of the first and second embodiments are denoted by the reference symbols identical with those of the first and second embodiments, an illustration and description of them are omitted, and only parts different from those of the first and second embodiments will be described.

In this second modification example, in order to secure the exit angle of the liquid crystal lens, the imaging element unit according to the second embodiment described previously is configured as follows.

In FIG. 7, in an imaging element unit 30, a photographic lens unit main body 60 is formed of a metallic plate material, and a contact section 250 having a spherical or tapered surface is provided on the outside of a second retention frame 194. Thus, opening sections of the second retention frame 194 and photographic lens unit main body 60 are formed. Further, spacers 252 and 254 made of an elastic material such as a rubber material are used in place of the springs. As a result of this, it becomes possible to make the liquid crystal lens and the light receiving surface of the imaging element closer to each other.

By the configuration described above too, it is possible to make the center of the liquid crystal and the optical axis center of the photographic lens coincide with each other.

The embodiments of the present invention have been described above. However, in addition to the embodiments described previously, the present invention can be variously modified and implemented within the scope not deviating from the gist of the invention.

Furthermore, inventions of various stages are included in the embodiments described previously, and by appropriately combining a plurality of disclosed constituent elements various inventions can be extracted. For example, even when some constituent elements are deleted from all the constituent elements shown in the embodiments, if the problem described in the paragraph of program to be solved can be solved, and the advantage described in the paragraph of advantage of the invention can be obtained, the constituents obtained after deleting the constituent elements can also be extracted as an invention.

According to the present invention, it is possible to provide a photographic lens unit in which it is easily possible to make an imaging element and an optical axis center of a liquid crystal optical element coincide with each other without making the size of the unit large, and an electronic apparatus using the photographic lens unit by employing a configuration in which a liquid crystal lens holder includes a first retention member and a second retention member, and the first retention frame including a first positioning section for performing positioning in an X-Y plane perpendicular to an optical axis of a liquid crystal optical element, and a second positioning section for specifying an optical axis direction, and the second retention frame including a connection section covering the liquid crystal optical element and connecting with the second positioning section are provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographic lens unit comprising:

a lens barrel frame which includes a first end part and a second end part located away from the first end part, the first end part including a first opening through which light is incident, and the second end part including a second opening through which light from the first opening passes outward;

photographic lenses which are located inside the lens barrel frame to form an optical image from the incident light in a side of the second end part of the lens barrel frame which has an optical axis, and which includes a liquid crystal optical element having a plurality of transparent electrode plates holding a liquid crystal between them, at least one of the transparent electrode plates including at least one first side and at least one second side extending in a direction crossing the at least one first side;

a board which is located on the second end part of the lens barrel frame and which includes an opening section surrounding the optical axis;

an imaging element which converts the optical image formed by the photographic lenses into an electric signal;

an imaging element holder which holds the imaging element;

a two-dimensional drive mechanism which is capable of driving the imaging element holder in directions perpendicular to the optical axis of the photographic lenses with respect to the board, and a liquid crystal optical element holder which is fixed to the lens barrel frame, which includes first and second retention members having facing portions facing each other, the first and second retention members holding the liquid crystal optical element between the facing portions, and each having an opening section surrounding the optical axis, the facing portion of the first retention member including a first positioning section which includes at least one first positioning reference surface and at least one second positioning reference surface extending in a direction crossing the at least one first positioning reference surface, the at least one first positioning reference surface and at least one second positioning reference surface being in contact with the at least one first side and at least one second side of the at least one of the transparent electrode plates of the liquid crystal optical element and positioning the liquid crystal optical element in a plane perpendicular to the optical axis of the photographic lenses, and the facing portion of the second retention member including a second positioning section which presses the liquid crystal optical element on the facing portion of the first retention member and which specifies a position of the liquid crystal optical element in a direction along the optical axis of the liquid crystal optical element.

2. The photographic lens unit according to claim 1, further comprising:

a thermal insulation member provided on the liquid crystal optical element holder, wherein the liquid crystal optical element holder is fixed to the lens barrel frame through the thermal insulation member.

3. The photographic lens unit according to claim 2, further comprising a thermal conductor provided on the liquid crystal optical element holder.

4. The photographic lens unit according to claim 1, wherein the two-dimensional drive mechanism employs an electromagnetic driving motor as a drive source.

5. The photographic lens unit according to claim 1, wherein the two-dimensional drive mechanism includes:

a plurality of drive coils arranged on one of the board and the imaging element holder, a plurality of drive magnets arranged on the other of the board and the imaging element holder and which face the drive coils to move the imaging element holder with respect to the board in the directions perpendicular to the optical axis of the photographic lenses in cooperation with the drive coils, and a plurality of position sensors arranged in a vicinity of the drive coils to detect a position of the imaging element holder with respect to the board in the directions perpendicular to the optical axis of the photographic lenses.

6. The photographic lens unit according to claim 1, wherein the imaging element holder is provided with a radiator plate which radiates heat from the imaging element.

7. The photographic lens unit according to claim 1, wherein the facing portions of the first and second retention members include a positioning mechanism which positions the first and second retention members relative to each other in the plane perpendicular to the optical axis of the liquid crystal optical element while the first and second retention members are combined with each other.

8. The photographic lens unit according to claim 7, wherein the positioning mechanism includes a plurality of positioning pins fixed to one of the facing portions of the first and second retention members and a plurality of positioning holes formed in the other of the facing portions and receiving the positioning pins while the first and second retention members are combined with each other.

* * * * *